United States Patent
Taguchi

[19]

[11] Patent Number: 6,045,912
[45] Date of Patent: Apr. 4, 2000

[54] LONG FIBER-REINFORCED THERMOPLASTIC RESIN MOLDING MATERIAL

[75] Inventor: Masamichi Taguchi, Tokyo, Japan

[73] Assignee: Asahi Fiber Glass Company, Limited, Tokyo, Japan

[21] Appl. No.: 09/145,614

[22] Filed: Sep. 2, 1998

[30] Foreign Application Priority Data

Sep. 8, 1997 [JP] Japan ..................................... 9-259300

[51] Int. Cl.$^7$ ............................. B29B 15/12; B29C 71/02
[52] U.S. Cl. ........................ 428/400; 428/357; 428/359; 428/361; 428/364; 428/392; 428/397; 428/401
[58] Field of Search ..................................... 428/357, 359, 428/361, 364, 392, 397, 401, 400

[56] References Cited

U.S. PATENT DOCUMENTS 4,067,942  1/1978  Wilson .
4,439,387  3/1984  Hawley .

FOREIGN PATENT DOCUMENTS 0 701 893   3/1996   European Pat. Off. .
52-10140    3/1977   Japan .
63-264326  11/1988   Japan .
6-254856    9/1994   Japan .

*Primary Examiner*—Richard Weisberger
*Attorney, Agent, or Firm*—Oblon, Spivak, McClelland, Maier & Neustadt, P.C.

[57] ABSTRACT

A long fiber-reinforced thermoplastic resin molding material in the form of pellets each having inorganic filaments arranged substantially in the same length and in parallel in the same direction in a matrix of a thermoplastic resin, wherein the exposed ratio E as defined by the following formula (1) is at most 60%, on at least one end surface in the direction of the filaments of each pellet:

$$E = (e/N) \times 100 \qquad (1)$$

where E is the exposed ratio (%), e is the number of inorganic filaments with their cross-sections exposed on at least one end surface in the direction of the filaments of each pellet, and N is the total number of inorganic filaments arranged in the pellet.

8 Claims, 2 Drawing Sheets

LONG FIBER-REINFORCED THERMOPLASTIC RESIN MOLDING MATERIAL

The present invention relates to a long fiber-reinforced thermoplastic resin molding material in the form of pellets each having inorganic filaments arranged substantially in the same length and in parallel in the same direction in a matrix of a thermoplastic resin.

Heretofore, long fiber-reinforced thermoplastic resin molding materials have been proposed for the purpose of improving mechanical properties, particularly impact strength and heat resistance, of thermoplastic resin molded products reinforced with inorganic fibers. These materials are usually prepared, as disclosed, for example, in JP-B-52-10140, by supplying a bundle of continuous inorganic fibers to an impregnation die (a molten resin bath) to have a molten thermoplastic resin coated on or impregnated in the bundle, then removing an excess thermoplastic resin through a nozzle, slit or die having a predetermined opening size, provided at the outlet of the impregnation die, to bring the fiber content to a predetermined level and to shape the cross-section to a predetermined configuration, followed by cooling and then cutting into a predetermined length to obtain cut products in the form of e.g. pellets. The cut products in the form of pellets i.e. the long fiber-reinforced thermoplastic resin materials, are ones having inorganic filaments arranged substantially in the same length and in parallel in the same direction in a matrix of a thermoplastic resin.

The long fiber-reinforced thermoplastic resin molding materials thus obtained, may be molded, alone as they are, or after mixing them with a thermoplastic resin containing no inorganic fiber to bring the fiber content to a desired level and adding a colorant or other additives, as the case requires, depending upon the molding method or the particular application of the molded products, into desired shapes by such a method as injection molding, to obtain molded products. Further, for transporting a molding material containing a long fiber-reinforced thermoplastic resin molding material at the time of molding, it is common to employ a transporting means by an air stream or the like (air transportation or the like).

However, with the long fiber-reinforced thermoplastic resin molding materials produced by such a conventional method, it was common that inorganic fibers were exposed on end surfaces by cutting, and fine cracks were observed along the fibers at the portions adjacent to the end surfaces. Further, in many cases, the thermoplastic resin was hardly adequately impregnated into the interior of a bundle of inorganic fibers, whereby it was likely that void spaces formed among filaments constituting the fiber bundle, and inorganic fibers were likely to be exposed also on the outer peripheral surface of the molding materials. Accordingly, if such long fiber-reinforced thermoplastic resin molding materials were transported by a stream such as an air stream, the molding materials were likely to crack along the fibers, starting from the portions at which the fibers were exposed on the end surfaces of the molding materials, or the fibers were likely to peel, whereby the filaments are likely to fall and to form fuzz. If such fuzz was formed, there were problems such that the transportation was troublesome, and supply of the molding materials to the molding machine tended to be troublesome. Further, with a molding material where fuzz is likely to form during the transportation, there is an additional problem that the appearance of the molded product tends to be poor by the fuzz formed during the transportation. Further, with a molding material having the thermoplastic resin hardly adequately impregnated in the inorganic fiber bundle, it tends to be difficult to uniformly disperse inorganic fibers in the thermoplastic resin during the molding, whereby the mechanical properties of the resulting molded product tends to be poor, and the appearance of the molded product tends to be poor.

To solve such problems, particularly for the main purpose of improving the impregnation of the thermoplastic resin to the inorganic fiber bundle to prevent formation of void spaces among filaments, for example, U.S. Pat. No. 4,439,387, JP-A-63-264326 and JP-A-6-254856, disclose a process for producing a long fiber-reinforced thermoplastic resin molding material, wherein an inorganic fiber bundle introduced into an impregnation die is spread by exerting a tension by contacting the bundle with a protrusion, a roller or the like provided in the impregnation die, to improve the impregnation of the thermoplastic resin into the inorganic fiber bundle.

However, the process disclosed in e.g. U.S. Pat. No. 4,439,387, JP-A-63-264326 and JP-A-6-254856, has a problem that as the inorganic fiber bundle is spread by exerting a tension by contacting it with a protrusion, a roller or the like, a part of filaments constituting the inorganic fiber bundle tends to break by abrasion to form fuzz, and this fuzz is likely to clog e.g. the nozzle of the impregnation die or close the nozzle, whereby the tensile resistance of the inorganic fiber bundle tends to increase, and the inorganic fiber bundle tends to break, whereby the production will have to be stopped. Further, if the tension during the contact with the protrusion, the roller or the like, is weak, no adequate spreading can be attained, and there has been a problem that no adequate improvement has been attained for impregnation of the thermoplastic resin. The content of glass fibers in the long glass fiber-reinforced thermoplastic resin molding material using long glass fibers as inorganic fibers, is usually from 20 to 80 wt %. The above-mentioned problem due to formation of fuzz during the production, transportation or molding, is likely to occur particularly when the glass fibers are contained in a high proportion of at least 50 wt %.

Also in a case where a long fiber-reinforced thermoplastic resin molding material is prepared by a method other than the above-described process, for example, by a process which comprises cutting an inorganic fiber bundle in a predetermined length to obtain chopped strands and then coating an emulsion or a suspension of a thermoplastic resin on the chopped strands by a means such as spraying, there has been a problem that the coating of the thermoplastic resin tends to be non-uniform, thus leading to formation of fuzz or poor dispersion of fibers.

The present invention has been made in view of the above-mentioned problems. It is an object of the present invention to provide a long fiber-reinforced thermoplastic resin molding material, whereby fuzz scarcely forms during the production or transportation, and when a thermoplastic resin molded product is formed by a method such as injection molding, the dispersibility of inorganic fibers in a thermoplastic resin as a matrix is excellent, and the mechanical properties and the appearance of the resulting thermoplastic resin molded product can be improved.

The present inventors have conducted an extensive research to accomplish the above object and as a result, have found that by reducing the exposed ratio of the cross-sections of inorganic filaments on the end surface of the long fiber-reinforced thermoplastic resin molding material, it is possible to substantially prevent formation of fuzz during the transportation, and to improve the dispersion of inorganic fibers in the resulting thermoplastic resin molded product, whereby the mechanical properties and the appearance of the molded product can be improved. The present invention has been accomplished on the basis of this discovery.

Namely, the present invention provides a long fiber-reinforced thermoplastic resin molding material in the form of pellets each having inorganic filaments arranged substantially in the same length and in parallel in the same direction in a matrix of a thermoplastic resin, wherein the exposed ratio E as defined by the following formula (1) is at most 60%, on at least one end surface in the direction of the filaments of each pellet:

$$E=(e/N)\times 100 \tag{1}$$

where E is the exposed ratio (%) e is the number of inorganic filaments with their cross-sections exposed on at least one end surface in the direction of the filaments of each pellet, and N is the total number of inorganic filaments arranged in the pellet.

The exposed ratio E in the present invention is defined by the above formula (1) and represents the ratio of the number e of the inorganic filaments with their cross-sections exposed, to the total number N of the inorganic filaments arranged in the pellet, on at least one end surface in the direction of the filaments of the long fiber-reinforced thermoplastic resin molding material in the form of pellets.

Figure 2:
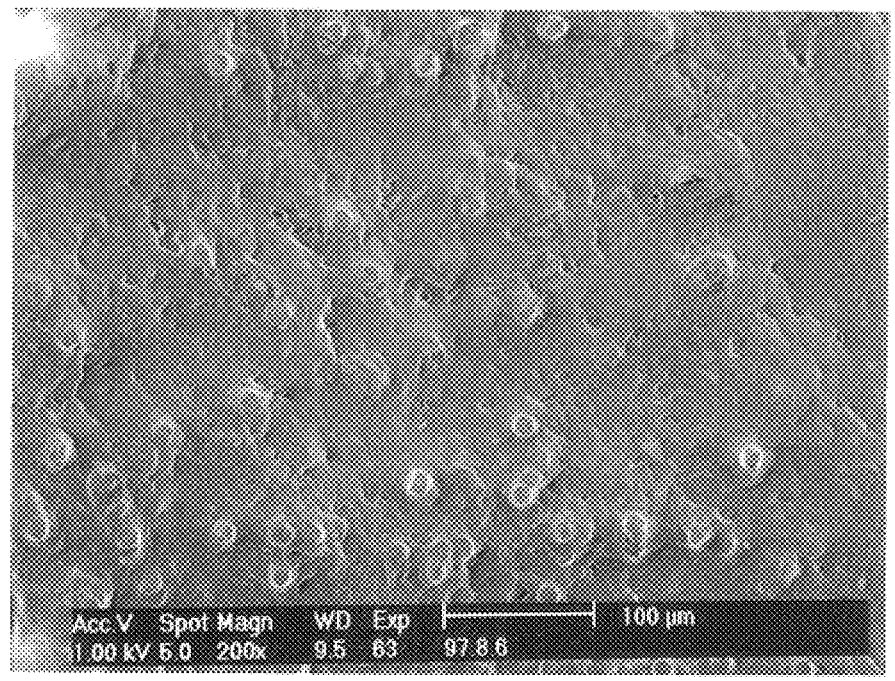
FIG. 2 is a scanning electron microscopic photograph with 200 magnifications of an end surface of the long fiber-reinforced thermoplastic resin molding material in an Example of the present invention.
Figure 3:
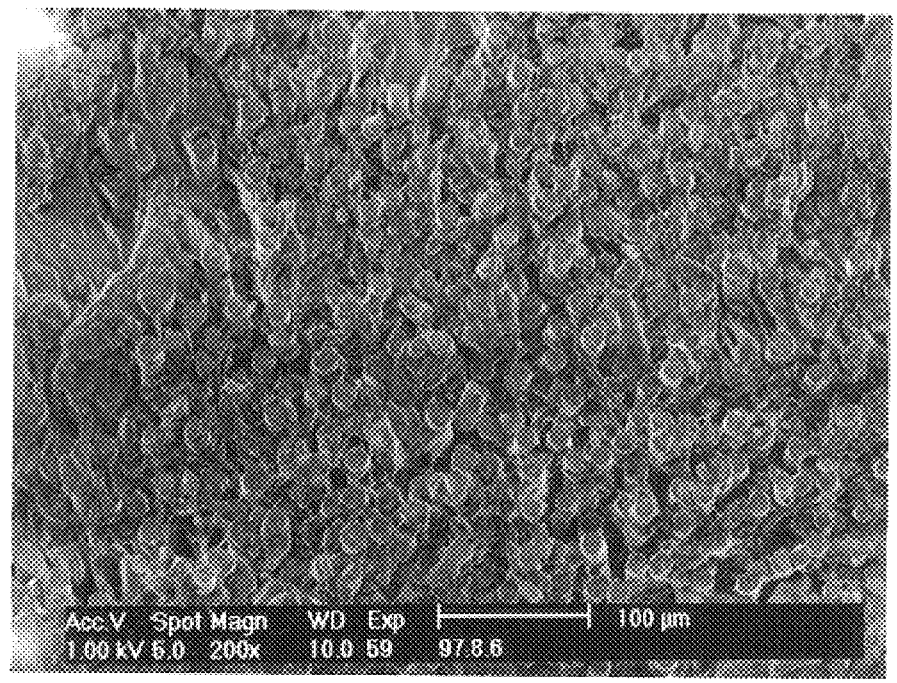
FIG. 3 is a scanning electron microscopic photograph with 200 magnifications of an end surface of the long fiber-reinforced thermoplastic resin molding material according to a conventional method.

Here, the state of the inorganic filaments with their cross-sections exposed, means the state where the cross-sections of the filaments are completely exposed without being covered by the resin, or the state where the resin is attached to only a part of the cross-sections of the filaments, and the peripheral portions of the filaments are exposed without being covered. Further, the state of the filaments at an end surface of the pellet, can be observed by means of a scanning electron microscope (SEM). In the observation by this SEM, the cross-sections of the filaments are observed to have a circular or cylindrical shape in a state where the cross-sections of the filaments are completely exposed without being covered by the resin or in a state where the resin is attached to only a part of the cross-sections of the filaments, and the peripheral portions of the filaments are exposed without being covered. On the other hand, in a state where the cross-sections of the inorganic filaments are covered by the thermoplastic resin and are not exposed, no cross-sections of inorganic filaments are observed by observation by SEM. FIG. 2 shows a scanning electron microscopic photograph with 200 magnifications showing an end surface of the long fiber-reinforced thermoplastic resin molding material of the present invention, and FIG. 3 is a scanning electron microscopic photograph with 200 magnifications showing an end surface of the conventional long fiber-reinforced thermoplastic resin molding material.

In the long fiber-reinforced thermoplastic resin molding material of the present invention, the inorganic filaments are covered with the resin so that the exposed ratio E of the cross-sections of the inorganic filaments is at most 60% on at least one end surface, whereby fine cracks are also covered to reduce cracks, and cracking of the molding material along the fibers, starting from the portions where the fibers are exposed at the end surface, scarcely takes place, and peeling of the fibers therefrom, is little. Accordingly, even at the time of transportation by a means such as an air stream, the inorganic filaments will not fall, and formation of fuzz scarcely takes place. Further, the resin is adequately impregnated among the filaments constituting the bundle of inorganic filaments, so that void spaces are little, whereby the inorganic filaments will be uniformly dispersed in the thermoplastic resin as the matrix at the time of producing a long fiber-reinforced thermoplastic resin molded product by a method such as injection molding, and the mechanical properties of the molded product will be improved, and the appearance will be good.

In the practice of the present invention, the above-mentioned exposed ratio E is preferably at most 30%. Further, it is preferred that the above inorganic filaments are glass filaments, and the content of the filaments is from 50 to 90 wt %. Further, the above-mentioned pellets are ones obtained by having a molten thermoplastic resin coated on or impregnated in a bundle of continuous inorganic filaments, then cutting the bundle in a predetermined length to obtain cut products, heating the cut products in a dispersed state at a temperature of at least the melting point of the thermoplastic resin, to melt the thermoplastic resin coated on or impregnated in the cut products, followed by cooling.

In the above construction, when glass filaments are used as the inorganic filaments, and the content of the filaments is adjusted to be from 50 to 90 wt %, the effects such as improvement in the dispersibility of fibers in a matrix resin during molding and reduction of formation of fuzz, can be obtained more remarkably.

Now, the present invention will be described in further detail with reference to specific embodiments.

In the present invention, as the reinforcing material, it is preferred to employ an inorganic fiber bundle having a predetermined number of inorganic filaments bundled together. This inorganic fiber bundle may be one commonly used for a long fiber-reinforced thermoplastic resin molding material. For example, it is preferred to employ one withdrawn from a bobbin formed by winding up a bundle of inorganic fibers such as glass fibers or carbon fibers into a barrel or cylindrical shape. It is particularly preferred to employ glass fibers, since they are advantageous from the viewpoint of costs.

Further, as the inorganic filaments constituting the inorganic fiber bundle, those having a filament diameter of from 4 to 30 µm are preferably employed, and the number of filaments to be bundled is preferably from 100 to 20,000, so that a thermoplastic resin may easily be coated or impregnated to the fiber bundle. Further, a plurality of inorganic fiber bundles each having a relatively small number of bundled filaments, may be used by putting them together.

Various binders are usually applied in order to improve the handling efficiency by suppressing formation of fuzz or static electricity during use, or in order to improve the adhesion of glass fibers to a thermoplastic resin as matrix. The type of such a binder may be suitably selected depending upon the type of the thermoplastic resin as matrix. Further, the amount of the binder to be applied to the glass fibers is preferably from 0.1 to 3.0 wt %, to the glass fibers. If the amount is less than 0.1 wt %, it tends to be difficult to sufficiently improve the above-mentioned handling efficiency or adhesion. On the other hand, if it exceeds 3.0 wt %, the binder tends to hinder impregnation of the thermoplastic resin into filaments. Such a binder may usually comprise a coupling agent represented by a silane coupling agent such as aminosilane, epoxysilane or acrylsilane, and a polymer such as a vinyl acetate resin, a urethane resin, an acrylic resin, a polyester resin, a polyether resin, a phenoxy resin, a polyamide resin, an epoxy resin or a polyolefin resin, or its modified product, or an oligomer such as a wax represented by a polyolefin wax. However, it is common that the above polymer or oligomer is used usually in the form of an aqueous dispersion obtained by dispersing it in water by a surfactant, or in the form of an aqueous solution obtained by water-solubilization in water by neutralization or hydration of carboxyl groups or amide groups present in the polymer or oligomer structure.

Further, the above binder may contain, in addition to the above components, an antistatic agent represented by an inorganic salt such as lithium chloride or potassium iodide, or a quaternary ammonium salt of e.g. an ammonium chloride type or an ammonium ethylsulfate type, or a lubricant represented by a surfactant of an aliphatic ester type, an aliphatic ether type, an aromatic ester type or an aromatic ether type.

The thermoplastic resin used as matrix in the present invention, is not particularly limited, and it is possible to employ, for example, polyethylene, polypropylene, polyamide, polyethylene terephthalate, polybutylene terephthalate, polystyrene, a styrene-acrylonitrile copolymer, an acrylonitrile-butadiene-styrene copolymer, polyacetal, polyetherimide or polycarbonate. In the present invention, such resins may be used alone or in combination as a mixture of two or more of them, or a copolymer obtained by preliminarily copolymerizing two or more of them, may be employed. Further, to the thermoplastic resin, known additives such as a colorant, a modifier, and a filler other than inorganic fibers, may suitably be incorporated depending upon the particular application or molding conditions, and such additives may be used by mixing them with the resin in accordance with a conventional method.

The long fiber-reinforced thermoplastic resin molding material of the present invention is in the form of pellets having inorganic filaments arranged substantially in the same length and in parallel in the same direction in a matrix of the thermoplastic resin. In this case, "arranged substantially in the same length and in parallel in the same direction" means that the majority of inorganic filaments are arranged substantially in parallel with one another in the same direction, but a part of filaments may partially be curved or entangled with one another. Further, for the inorganic filaments to be substantially in the same length, the inorganic filaments are arranged with their cut cross-sections substantially uniformly disposed at the end surfaces in the direction of the filaments of each pellet.

At the end surfaces in the direction of filaments of conventional long fiber-reinforced thermoplastic resin molding materials, it has been common that the cross-sections of most of inorganic filaments contained, are exposed. Whereas, on at least one end surface in the direction of filaments of the long fiber-reinforced thermoplastic resin molding material of the present invention, the exposed ratio E as defined above, is at most 60%, whereby filaments with their cross-sections exposed are relatively small in number, whereby it is less likely that the molding material cracks along the fibers starting from the portions where the fibers are exposed, and the filaments are less susceptible to peeling. Accordingly, even with a molding material having a high content of fibers at a level of at least 50 wt %, the filaments scarcely fall, and fuzz scarcely forms. Further, the exposed ratio E is preferably adjusted to be at most 30% in order to minimize formation of fuzz during e.g. transportation and to improve dispersion of inorganic filaments at the time of molding to obtain a molded product.

Further, in the molding material of the present invention, the thermoplastic resin is impregnated among filaments in pellets, whereby high dispersibility of fibers can be attained during molding, and excellent mechanical properties of a molded product can be obtained.

In the present invention, the fiber content, i.e. the content of inorganic filaments, in the long fiber-reinforced thermoplastic resin molding material is not particularly limited. However, in order to obtain a remarkable effect of the present invention, the fiber content is preferably adjusted to be at least 50 wt %. Namely, when the fiber content is at least 50 wt %, problems such as a decrease in impregnation of the thermoplastic resin into the inorganic fiber bundle and formation of fuzz during e.g. transportation, are usually likely to occur. By the present invention, however, even when the fiber content is at least 50 wt %, it is possible to improve the impregnation of the thermoplastic resin into the organic fiber bundle and to reduce formation of fuzz during e.g. transportation. On the other hand, the fiber content is preferably at most 90 wt %. If the fiber content exceeds 90 wt %, the thermoplastic resin component tends to be small relative to the inorganic fibers, whereby it tends to be difficult to make the exposed ratio E to be at most 60%.

Further, in the present invention, the length of the long fiber-reinforced thermoplastic resin molding material is not particularly limited, but it is preferably from 3 to 30 mm. If the length is less than 3 mm, fuzz is likely to form during preparation of pellets of the long fiber-reinforced thermoplastic resin molding material. If the length exceeds 30 mm, dispersion of fibers tends to be poor when molding is carried out by a method such as an injection molding method.

Figure 1:
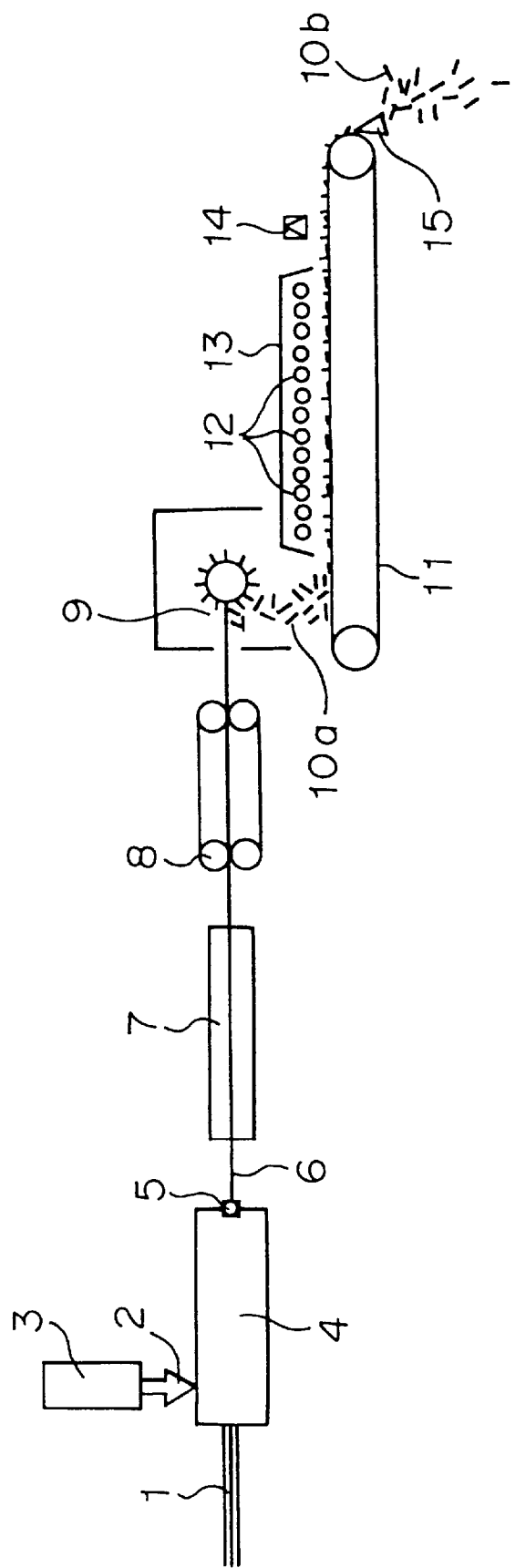
FIG. 1 is a schematic view illustrating an embodiment of the process for producing the long fiber-reinforced thermoplastic resin molding material of the present invention.

The long fiber-reinforced thermoplastic resin molding material of the present invention can be produced, for example, by the process as shown in FIG. 1.

Namely, a continuous inorganic fiber bundle 1 withdrawn from a bobbin not shown, is introduced into an impregnation die 4. To the impregnation die 4, a molten thermoplastic resin 2 is supplied from an extruder 3, and the thermoplastic resin is impregnated to the inorganic fiber bundle 1. The inorganic fiber bundle 1 impregnated with the thermoplastic resin, is withdrawn through a die 5, whereby an excess thermoplastic resin 2 is removed to obtain a prescribed fiber content, and at the same time, the bundle is shaped into a prescribed shape to obtain a long fiber-reinforced thermoplastic resin 6.

Then, the long fiber-reinforced thermoplastic resin 6 thus obtained, is cooled in a cooling tank 7, withdrawn by a withdrawing machine 8 and cut into pellets by a pelletizer 9 to obtain cut products 10a. The process up to here, is a process so-called a melt impregnation method which is the same as a conventional common process for producing a long fiber-reinforced thermoplastic resin molding material, and the cut products 10a correspond to a common conventional long fiber-reinforced thermoplastic resin molding material. Here, on the end surfaces of the cut products 10a, most of the cross-sections of inorganic filaments formed by cutting by means of the pelletizer 9, are exposed, and fine cracks are formed along fibers in the vicinity of the end surfaces by the impact at the time of cutting.

In the present invention, the cut products 10*a* obtained as described above, are then sent to a belt conveyor 11 installed in continuation from the pelletizer 9, and the belt conveyor 11 is vibrated by a vibrator not shown, so that the cut products 10*a* will be in a dispersed state substantially not to contact one another on the belt conveyor 11. Then, they are passed through a heating chamber 13 equipped with heaters 12 and heated to a temperature of at least the melting point of the thermoplastic resin 2. As a result, the thermoplastic resin 2 impregnated in the cut products 10*a* is melted and oozes out at the end surfaces and the periphery of the cut products 10*a* to cover at least a part of the exposed inorganic fibers, and at the same time, penetrate among filaments constituting the inorganic fiber bundles in the cut products 10*a*. Thereafter, the cut products 10*a* are cooled by a cooler 14 and scraped from a belt conveyor 11 by a scraper 15 to obtain a long fiber-reinforced thermoplastic resin molding material 10*b*. This long fiber-reinforced thermoplastic resin molding material 10*b* has at least a part of the end surfaces covered with the thermoplastic resin 2, whereby the exposed ratio E of the cross-sections of inorganic filaments is at most 60%, and fine cracks formed during the cutting have almost disappeared.

Further, between the pelletizer 9 and the belt conveyor 11, or on the rear side of the belt conveyor 11, a sieve or other apparatus may be provided for removing defective products formed during the cutting, fallen filaments or powder dust.

In the above process, the state in which the cut products 10*a* are dispersed substantially not to contact one another on the belt conveyor 11, is meant for a state wherein the majority of the cut products can maintain the individually separated state without sticking to one another, when the thermoplastic resin coated on or impregnated in the cut products, is melted and then cooled.

A method for transporting the cut products 10*a* to the heating chamber 13 may be a method other than the method by means of the belt conveyor 11. For example, it may be a method of transporting them with a stream such as an air stream, or a method of permitting them to fall freely. In a case where a method of using a belt conveyor 11 is employed, it is preferred to preliminarily treat the surface of the belt conveyor 11 with e.g. a silicone resin or a fluorine resin, whereby scraping of the cut products from the belt conveyor 11 will be facilitated, when the thermoplastic resin 2 of the cut products 10*a* is heated and melted and then cooled to obtain a long fiber-reinforced thermoplastic resin molding material 10*b*.

The heaters 12 for the heating chamber 13 are not particularly limited, but a hot air generator or an infrared heater may preferably be employed. The heating temperature and the heating time are the temperature and the time sufficient for the thermoplastic resin 2 impregnated in the cut products 10*a* to melt and cover the end surfaces and the periphery of the cut products 10*a* and penetrate among internal filaments, and preferably the temperature and the time at a level not to deteriorate the thermoplastic resin 2. The interior of the heating chamber 13 may be an atmosphere of air, but to prevent deterioration of the thermoplastic resin 2, it may be made to be an inert gas atmosphere such as nitrogen gas.

The cooling method by a cooler 14 may be a method whereby the long fiber-reinforced thermoplastic resin molding material 10*b* can be cooled to at least a temperature at which the molding material does not fuse when recovered. For example, a method of using cool air or cool water, may be employed. However, when cooling by a water tank as the cooling tank 7, is employed, it is preferred to use cool air for the cooler 14 in order to let the heating chamber 13 perform a step of removing (drying) water, since it is thereby unnecessary to provide a redrying step. Further, a method of natural cooling at room temperature may be employed instead of the forcible cooling at the cooler 14.

In the above embodiment, a melt impregnation method wherein a molten thermoplastic resin 2 is impregnated to the inorganic fiber bundle 1, was employed as a method for coating or impregnating a thermoplastic resin to a continuous inorganic fiber bundle 1. However, other methods may be employed. For example, it is possible to employ a method wherein an emulsion of a thermoplastic resin, a suspension having a thermoplastic resin powder dispersed in water or other liquid, or a resin solution having a thermoplastic resin dissolved in a solvent, is coated or impregnated to the inorganic fiber bundle, and then the dispersing medium or the solvent is removed. Further, as a method for coating or impregnating, a method of using a roll coater or a curtain coater may be employed instead of the method of using an impregnation die. Further, it is also possible to employ a method wherein a thermoplastic resin powder is applied to the inorganic fiber bundle, and then, if necessary, heated and melted, followed by cooling. However, it is preferred to employ the melt impregnation method, since a drying or solvent-removal step is not required, and the cost is low. Further, by the above-described process, impregnation of the resin to the inorganic fiber bundle can be facilitated by the heating step of the cut products 10*a*, even without spreading the inorganic fiber bundle by exerting a tension by contacting the bundle with a protrusion or roller in the impregnation die to impregnate the resin, as required by the conventional technique.

As a process for producing the long fiber-reinforced thermoplastic resin molding material of the present invention, a process other than the one described in the foregoing, may be employed. For example, the inorganic fiber bundle may be cut into a prescribed length to obtain chopped strands, then, an emulsion or suspension of a thermoplastic resin may be coated on the chopped strands by a method such as spraying, followed by drying to obtain pellets, or a composite fiber bundle having inorganic fiber bundles and thermoplastic resin fiber bundles commingled, may be cut into chopped strands, and such pellets or chopped strands may be employed instead of the above-described cut products 10*a*.

Further, as a method for covering the end surfaces of the cut products 10*a* or the pellets with a thermoplastic resin to bring the exposed ratio E of the cross-sections of inorganic filaments to a level of at most 60%, it is possible to employ a method wherein an emulsion or suspension of a thermoplastic resin is applied to the cut products 10*a* or the pellets by a method such as spraying, followed by drying, a method wherein the cut products 10*a* or the pellets are dipped in an emulsion or suspension of a thermoplastic resin, followed by drying, or a method wherein a powder of a thermoplastic resin is applied to the cut products 10*a* or the pellets, followed by heating to fuse the powder. In these cases, the thermoplastic resin constituting the matrix of the cut products 10*a* or the pellets, i.e. the thermoplastic resin impregnated to the inorganic fiber bundle, and the thermoplastic resin to be applied later to cover the end surfaces, may be the same resin, or different types of resins.

However, it is most preferred to employ the method as shown in FIG. 1 wherein the cut products obtained by a melt impregnation method, are heated and cooled in a dispersed state substantially not to contact one another on a belt conveyor, since it is thereby unnecessary to employ a drying or solvent-removal step after coating or impregnating the thermoplastic resin to the inorganic fiber bundle, and the productivity is relatively high and the costs of e.g. the resin is relatively low.

Now, the present invention will be described in further detail with reference to Examples. However, it should be understood that the present invention is by no means restricted to such specific Examples.

EXAMPLE 1

A long fib

A long fiber-reinforced thermoplastic resin molding material was prepared in accordance with the process described above along the production steps illustrated in FIG. 1. 800 E glass filaments having a filament diameter of 13 μm, were bundled, and after applying a binder comprising an aminosilane coupling agent and a modified propylene as the main components, in an amount of 0.5 wt % as the solid content to the entire fiber bundle, wound up into a cylindrical shape and then dried to obtain a bobbin. Eight fiber bundles withdrawn from such bobbins, were put together and used as a continuous inorganic fiber bundle 1. As the thermoplastic resin 2, a polypropylene resin was used, and as the impregnation die 4, the cooling tank 7, the withdrawing machine 8 and the pelletizer 9, conventional ones were used. The opening diameter of the die 5 at the outlet of the impregnation die 4 was 2.2 mm, and the withdrawing speed was 30 m/min. The cut products 10a were obtained with the cutting length of 6 mm at the pelletizer 9.

The obtained cut products 10a were placed on the belt conveyor 11 having the surface treated with a fluorine resin, and the belt conveyor 11 was vibrated to disperse the cut products 10a so that they did not substantially contact one another. In that state, the cut products 10a were introduced into a heating chamber 13 at an atmosphere temperature of 200° C. provided with heaters 12 which were infrared ray heaters and retained for 1 minute for heating. Then, they were cooled to about 40° C. by blowing a cool air from the cooler 14 to which compressed air was supplied from an air compressor and then scraped from the belt conveyor 11 by a scraper 15, to obtain the long fiber-reinforced thermoplastic resin molding material 10b. This long fiber-reinforced thermoplastic resin molding material 10b had a glass fiber content of 51 wt %.

EXAMPLE 2

A long fiber-reinforced thermoplastic resin molding material having a glass fiber content of 60 wt %, was obtained by the same apparatus and conditions as in Example 1 except that in Example 1, as the continuous inorganic fiber bundle 1, one having put together 10 glass fiber bundles obtained by bundling 800 E glass filaments having a filament diameter of 13 μm and having the same binder applied, was used.

EXAMPLE 3

A long fiber-reinforced thermoplastic resin molding material having a glass fiber content of 73 wt %, was obtained by the same apparatus and conditions as in Example 1 except that in Example 1, as the continuous inorganic fiber bundle 1, one having put together 13 glass fiber bundles obtained by bundling 800 E glass filaments having a filament diameter of 13 μm and having the same binder applied, was used.

COMPARATIVE EXAMPLE 1

A long fiber-reinforced thermoplastic resin molding material having a glass fiber content of 51 wt %, was obtained by the same fiber bundle, thermoplastic resin, apparatus and conditions as in Example 1 except that in Example 1, the process up to obtaining the cut products 10a was carried out in the same manner, and the subsequent process including a step of heating the cut products 10a, was omitted.

COMPARATIVE EXAMPLE 2

A long fiber-reinforced thermoplastic resin molding material having a glass fiber content of 60 wt %, was obtained by the same fiber bundle, thermoplastic resin, apparatus and conditions as in Example 2 except that in Example 2, the process up to obtaining the cut products 10a was carried out in the same manner, and the subsequent process including the step of heating the cut products 10a, was omitted.

COMPARATIVE EXAMPLE 3

A long fiber-reinforced thermoplastic resin molding material having a glass fiber content of 73 wt %, was obtained by the same fiber bundle, thermoplastic resin, apparatus and conditions as in Example 3 except that in Example 3, the process up to obtaining the cut products 10a was carried out in the same manner, and the subsequent process including a step of heating the cut products 10a, was omitted.

TEST EXAMPLES

The long fiber-reinforced thermoplastic resin molding materials obtained in Examples 1 to 3 and Comparative Examples 1 to 3, were, respectively, mixed with the prescribed amounts of polypropylene, followed by injection molding to obtain test specimens.

With respect to the obtained test specimens, the state of dispersion of the glass fibers was visually observed, whereby a glass fiber bundle observed in a bundled state is regarded as a non-dispersed portion i.e. a portion where dispersion was poor, and the number of such bundles was counted and converted to a number per 100 $cm^2$ from the size of the test specimens. Further, as the mechanical properties of the respective test specimens, the tensile strength and the bending strength were measured in accordance with ASTM D638 and ASTM D790.

Further, with respect to the long fiber-reinforced thermoplastic resin molding materials obtained in Examples 1 to 3 and Comparative Examples 1 to 3, 10 kg of each was transported for a distance of 3 m in a polyvinyl chloride tube with an inner diameter of 50 mm by a hopper loader ("BS-700", tradename, manufactured by Kato Riki K.K.), and fuzz formed during the transportation was collected by a metal net of 100 mesh provided at a suction inlet of the hopper loader, and the weight was measured.

Further, with respect to 10 pellets optionally selected from each of the long fiber-reinforced thermoplastic resin molding materials obtained in Examples 1 to 3 and Comparative Examples 1 to 3, one end surface and the periphery of each was covered with a thermosetting unsaturated polyester resin to prevent falling of filaments or deformation of the pellet by washing, and the resin was cured. Then, the pellets were cleaned for 30 minutes by a ultrasonic cleaning machine to remove chips and foreign matters from the end surface which was not covered with the unsaturated polyester resin, and then dried to obtain samples for evaluation by inspection of the end surface of the molding material.

Using such samples for evaluation, the end surface which was not covered with the unsaturated polyester resin, was observed by a scanning electron microscope (SEM), whereby the number (e) of glass filaments with their cross-sections exposed without being covered with a thermoplastic resin, was counted and its ratio i.e. the exposed ratio E, to the total number (N) of glass filaments contained in the molding material, was calculated. Then, an average value of the exposed ratios E of 10 pellets, was obtained.

The results of the foregoing tests are shown in Table 1. Further, a scanning electron microscopic photograph with 200 magnifications of the end surface of a pellet in Example 3 is shown in FIG. 2, and a scanning electron microscopic photograph with 200 magnifications of the end surface of a pellet of Comparative Example 3, is shown in FIG. 3.

TABLE 1

| | Example 1 | Example 2 | Example 3 | Comparative Example 1 | Comparative Example 2 | Comparative Example 3 |
| --- | --- | --- | --- | --- | --- | --- |
| Glass fiber content (wt %) | 51 | 60 | 73 | 51 | 60 | 73 |
| Cut length (mm) | 6 | 6 | 6 | 6 | 6 | 6 |
| Number of non-dispersed bundles (per 100 cm$^2$) | 0 | 0 | 0 | 3 | 7 | 15 |
| Amount of fuzz formed during transportation (mg) | 2 | 11 | 24 | 42 | 98 | 264 |
| Glass fiber content of test specimen (wt %) | 20.2 | 20.3 | 20.1 | 20.5 | 20.0 | 20.3 |
| Tensile strength of test specimen (kg/mm$^2$) | 8.9 | 9.1 | 8.5 | 8.2 | 8.4 | 7.9 |
| Bending strength of test specimen (kg/mm$^2$) | 13.5 | 13.1 | 13.2 | 12.3 | 12.2 | 12.0 |
| Exposed ratio E of filaments | 8 | 11 | 24 | 72 | 68 | 76 |

As described in the foregoing, according to the present invention, in the long fiber-reinforced thermoplastic resin molding material in the form of pellets each having inorganic filaments arranged substantially in the same length and in parallel in the same direction in a matrix of a thermoplastic resin, the exposed ratio E of the inorganic filaments is adjusted to be at most 60% on at least one end surface in the direction of the filaments in each pellet, whereby it is possible to suppress falling of filaments from the material during e.g. transportation, to reduce formation of fuzz, to provide good dispersion of fibers in a molded product and to obtain excellent mechanical properties for the molded product.

What is claimed is:

1. A long fiber-reinforced thermoplastic resin molding material in the form of pellets each having inorganic filaments arranged substantially in the same length and in parallel in the same direction in a matrix of a thermoplastic resin, wherein the exposed ratio E as defined by the following formula (1) is at most 60%, on at least one end surface in the direction of the filaments of each pellet:

$$E = (e/N) \times 100 \qquad (1)$$

where E is the exposed ratio (%), e is the number of inorganic filaments with their cross-sections exposed on at least one end surface in the direction of the filaments of each pellet, and N is the total number of inorganic filaments arranged in the pellet.

2. The long fiber-reinforced thermoplastic resin molding material according to claim 1, wherein the exposed ratio E is at most 30%.

3. The long fiber-reinforced thermoplastic resin molding material according to claim 1, wherein the inorganic filaments are glass filaments, and the content of the filaments is from 50 to 90 wt %.

4. The long fiber-reinforced thermoplastic resin molding material according to claim 2, wherein the inorganic filaments are glass filaments, and the content of the filaments is from 50 to 90 wt %.

5. The long fiber-reinforced thermoplastic resin molding material according to claim 1, wherein the pellets are ones obtained by having a molten thermoplastic resin coated on or impregnated in a bundle of continuous inorganic filaments, then cutting the bundle in a predetermined length to obtain cut products, heating the cut products in a dispersed state at a temperature of at least the melting point of the thermoplastic resin, to melt the thermoplastic resin coated on or impregnated in the cut products, followed by cooling.

6. The long fiber-reinforced thermoplastic resin molding material according to claim 2, wherein the pellets are ones obtained by having a molten thermoplastic resin coated on or impregnated in a bundle of continuous inorganic filaments, then cutting the bundle in a predetermined length to obtain cut products, heating the cut products in a dispersed state at a temperature of at least the melting point of the thermoplastic resin, to melt the thermoplastic resin coated on or impregnated in the cut products, followed by cooling.

7. The long fiber-reinforced thermoplastic resin molding material according to claim 3, wherein the pellets are ones obtained by having a molten thermoplastic resin coated on or impregnated in a bundle of continuous inorganic filaments, then cutting the bundle in a predetermined length to obtain cut products, heating the cut products in a dispersed state at a temperature of at least the melting point of the thermoplastic resin, to melt the thermoplastic resin coated on or impregnated in the cut products, followed by cooling.

8. The long fiber-reinforced thermoplastic resin molding material according to claim 4, wherein the pellets are ones obtained by having a molten thermoplastic resin coated on or impregnated in a bundle of continuous inorganic filaments, then cutting the bundle in a predetermined length to obtain cut products, heating the cut products in a dispersed state at a temperature of at least the melting point of the thermoplastic resin, to melt the thermoplastic resin coated on or impregnated in the cut products, followed by cooling.

* * * * *